US009724807B2

(12) United States Patent
You

(10) Patent No.: US 9,724,807 B2
(45) Date of Patent: Aug. 8, 2017

(54) CLIP CLAMPING MECHANISM OF PRESSURE FIXTURE AND PNEUMATIC CALIPER HAVING THE SAME

(71) Applicant: Yueqing Dongbo Electromechanical Co., Ltd., Yueqing, Zhejiang (CN)

(72) Inventor: Yixian You, Zhejiang (CN)

(*) Notice: Subject to any disclaimer, the term of this patent is extended or adjusted under 35 U.S.C. 154(b) by 305 days.

(21) Appl. No.: 14/094,122

(22) Filed: Dec. 2, 2013

(65) Prior Publication Data

US 2015/0013129 A1 Jan. 15, 2015

(30) Foreign Application Priority Data

Jul. 15, 2013 (CN) .......................... 2013 1 0299608

(51) Int. Cl.
*B23F 11/00* (2006.01)
*B25B 25/00* (2006.01)

(52) U.S. Cl.
CPC ....... *B25B 25/005* (2013.01); *Y10T 29/53717* (2015.01)

(58) Field of Classification Search
CPC .. B25B 5/04; B25B 5/087; B25B 9/00; B25B 7/00; B25B 7/126; B25B 27/146; F15B 11/0365; F15B 15/1442
See application file for complete search history.

(56) References Cited

U.S. PATENT DOCUMENTS 3,323,346 A 6/1967 Spangler et al.
3,471,191 A 10/1969 Schwab
6,606,984 B2 * 8/2003 Mugg .................. F41B 5/1469 124/35.2
7,290,431 B1 11/2007 Spivak
8,011,426 B1 * 9/2011 Orgeron .................. B25B 5/147 166/77.51
2004/0010899 A1 * 1/2004 Winterhalter ........... B25B 7/126 29/252

FOREIGN PATENT DOCUMENTS

CN 203390767 U 1/2014
CN 201310299608.4 B 4/2016
DE 8900250 U1 2/1989
DE 29509976 U1 8/1995
FR 1342859 A 11/1963

* cited by examiner

*Primary Examiner* — Monica Carter
*Assistant Examiner* — Nirvana Deonauth
(74) *Attorney, Agent, or Firm* — Wayne & Ken, LLC

(57) ABSTRACT

A clip clamping mechanism of a pressure fixture, which the clip comprises a fixedly mounted shaft, and a first clip and a second clip hinged through the fixed shaft. Two ends of the first clip and the second clip corresponding to the hinging joint form respectively a front arm, and a rear arm in linkage with a propulsion piece, wherein the propulsion piece is provided with an accommodation cavity for mounting the rear arm; and the accommodation cavity is provided with a wedge-shaped sidewall for butt junction and slip fit with the rear arm; one end of the accommodation cavity close to the front arm is a big end with opening, while the other end far away the front arm is a small end. The first clip and the second clip achieve a transmission connection through one fixed shaft only to realize butting clamp.

7 Claims, 5 Drawing Sheets

CLIP CLAMPING MECHANISM OF PRESSURE FIXTURE AND PNEUMATIC CALIPER HAVING THE SAME

FIELD OF THE INVENTION

The disclosure relates to a clamping mechanism and a pressure fixture having the same, and in particular to a clip clamping mechanism of a pressure fixture and a pneumatic caliper having the same.

BACKGROUND OF THE INVENTION

Pneumatic calipers used for extruding and clamping hoop, ring washer, pin, cable terminal, cable clip and the like are well known. Pneumatic calipers are particularly familiar in automobile industry, which are used to clamp ring washers onto pipe joint, coupling shaft and similar pieces during the assembling of inner tube and corrugated pipe.

Patent literature records a European patent document of which the application number is 00112559.0 and which then enters China through Patent Cooperation Treaty (PCT) and has a Chinese authorization proclamation No. of CN1264650C, and in which a device for pneumatic operation tool and a pneumatic clamp having the same are provided; this patent provides a pressure medium joint controlled by a valve and a wedge-shaped propulsion piece to control the opening or closing of clip adopting the principle of improving thrust through a plurality of pistons arranged in series to generate moving thrust.

The pneumatic clamp recorded in this patent document, as shown in FIG. 9, includes a clamp base 14, a cylinder 6, a rear base 7, and a clip 1, a wedge-shaped propulsion piece 2, a propulsion piece mounting base 21 for the mounting of the wedge-shaped propulsion piece, a plurality of pistons 3 arranged in series to generate moving thrust and a valve 8 used for controlling the conduction of pressure medium that are arranged along the same axial direction in turn. The clip 1 is fixedly arranged in the clamp base 14; the wedge-shaped propulsion piece 2, the propulsion piece mounting base 21 and the piston assembly all can be moveably arranged in the cylinder along the axial direction; the valve is arranged in the rear base and is in linkage with a valve control 9; the rear base is provided with a pressure medium entrance 71, which can be conducted with the inside of the cylinder 6. The clip 1 includes a first clip 11 and a second clip 12, wherein both the first clip 11 and the second clip 12 have a gripping jaw 111, 121, a strut portion 112, 122, and a mounting portion 114, 124 fixed on the clamp base 14 through a fastening piece 113, 123; one end of the wedge-shaped propulsion piece 2 corresponding to the strut portion 112, 122 is provided with a wedge-shaped side wall 21 to be pushed in between the two strut portions 112, 122 to stretch the two strut portions 112, 122, and one side of the wedge-shaped side wall 21 facing the strut portion 112, 122 forms a small end face, while the other side of the wedge-shaped side wall 21 facing the propulsion piece mounting base forms a big end face.

When this pneumatic clamp works, the pressure medium entrance 71 is in conduction connection with an external pressure medium, and the valve control 9 controls the opening of the valve 8 so that the pressure medium entrance 7 is conducted with the inside of the cylinder 6; then, the pressure medium pushes, as a power source, the piston 3 to move towards the wedge-shaped propulsion piece 2; and then, the wedge-shaped propulsion piece 2 is driven to move towards the clip 1 to be pushed in between the two strut portions 112, 122 to stretch the two strut portions 112, 122, so that the two gripping jaws 111, 121 clamp tightly.

Relevant documents cited in the background of this patent document, for example, DE3742782, DE8900250.4, DE19519543 and DE29509976, also describe this type of pressure medium grip having pressure pistons arranged in series, wherein the clip and the wedge-shaped propulsion piece also adopt the similar structure, that is, the wedge-shaped propulsion piece is pushed in between two strut portions to stretch the two strut portions, so that the two gripping jaws clamp tightly.

For pneumatic gripper, particular for the pressure medium gripper described above, moving thrust is generated in the clip by means of a propulsion tool, for example, the wedge-shaped propulsion piece of the above structure; and the extrusion force of the gripping jaw depends on the thrust of the propulsion tool. However, in existing designs known in conventional art, since the wedge-shaped propulsion piece is pushed in between two strut portions to stretch the two strut portions, and the first clip and the second clip are mounted on the clamp base through two fixed shafts to realize a butting clamping function, two hinging joints are needed, thus manufacturing cost is high, damage is easily caused and the service life is short.

SUMMARY OF THE INVENTION

In view of the defects existing in conventional art, the disclosure aims at providing a clip clamping mechanism of a pressure fixture, in which the first clip and the second clip achieve a transmission connection through one fixed shaft only to realize butting clamp, and which reduces manufacturing cost, is more difficult to damage and has a long service life.

In order to achieve the above aim, the disclosure provides the following scheme. A clip clamping mechanism of a pressure fixture is provided, including: a clip, a propulsion piece, and a drive unit which is used for pushing the propulsion piece to move towards one side of the clip so that the propulsion piece controls the opening or clamping of the clip, wherein the clip includes a fixedly mounted shaft, and a first clip and a second clip hinged through the fixed shaft; two ends of the first clip and the second clip corresponding to the hinging joint form respectively a front arm, and a rear arm in linkage with the propulsion piece, wherein the propulsion piece is provided with an accommodation cavity for mounting the rear arm; and the accommodation cavity is provided with a wedge-shaped sidewall for butt junction and slip fit with the rear arm; one end of the accommodation cavity close to the front arm is a big end with opening, while the other end far away the front arm is a small end.

In the compared document, through the above technical scheme, the first clip and the second clip are mounted on the clamp base through two fixed shafts to realize a butting clamp function. In this disclosure, it is changed as that the first clip and the second clip are in a transmission connection through one fixed shaft only to realize butting clamp; then, this clip clamping mechanism, compared with that in the compared document, saves a fixed shaft, reduces manufacturing cost, is more difficult to damage and has a long service life.

The disclosure is further designed as: the accommodation cavity is provided with a separator plate for separating the rear arm of the first clip and the rear arm of the second clip.

The accommodation cavity shrinks gradually from the big end to the small end and the wedge-shaped sidewall presents a straight line.

The accommodation cavity shrinks gradually from the big end to the small end and the wedge-shaped sidewall presents a bulged circular arc.

Both the rear arms of the first clip and the second clip are provided with a pulley for slip fit with the wedge-shaped sidewall.

The accommodation cavity is arranged as a conical structure.

One end of the propulsion piece corresponding to the clip is provided with a propulsion piece reset spring for resetting the propulsion piece, wherein both the two rear arms are sleeved in the propulsion piece reset spring.

A pneumatic caliper is provided, which has any one clip clamping mechanism of the pressure fixture described in claim 1 to claim 2.

The pneumatic caliper of the disclosure is further designed to include: a cylinder having a passage, and a clamp base and a rear base arranged at two ends of the cylinder respectively, wherein the clip is fixedly connected with the clamp base; a drive unit is arranged in the cylinder and at least includes a set of piston assembly; the rear base is provided with a pressure medium opening for entrance of power source air; the pressure medium opening is in a conduction connection with the passage of the cylinder; the rear base is provided with an open/close valve for controlling the conduction or non-conduction between the pressure medium opening and the passage; the open/close valve is in linkage with a valve drive piece.

Through the above technical scheme, the pressure medium is changed as air. Air, as a power source, is stable and reliable, and has few or even no impurities remained between each component, thereby enabling the pneumatic clamp to have a longer service life without frequent maintenance; the drive unit being arranged as a piston assembly leads to stable and reliable transmission of propulsion piece.

The disclosure is further designed as: a set of piston assembly includes a piston, a piston rod and a piston cover; the cylinder is provided with two sets of piston assemblies arranged along the same axial direction in turn, wherein the piston rod of the latter set of piston assembly resists on the end face of the piston of the former set of piston assembly.

Through the above technical scheme, no extra sealing element is needed and cost can be reduced, by changing the procedure of arranging a sealing element at the edge of the end face of the piston rod facing a next piston (described in the compared document with authorization proclamation No. of CN1264650C) as the procedure of arranging the piston rod of the latter set of piston assembly to resist on the end face of the piston of the former set of piston assembly and ensuring a reliable connection between the two sets of piston assemblies during assembling.

In addition, this disclosure adopts the lever principle, so that the clamping force generated by the product in this disclosure is greater than that generated by the product in the compared document in the condition that the cylinder has the same specification; or, in the condition that the arm length is the same, the cylinder diameter of the product in this disclosure can be manufactured smaller so as to reduce the volume of the entire pressure fixture; in addition, if the manner of stretching the first clip and the second clip using a wedge-shaped propulsion piece described in the compared document is changed as the manner of arranging the rear arm of the clip into the accommodation cavity having a wedge-shaped sidewall and enabling the rear arm to form reliable slip fit with the wedge-shaped sidewall, then, the pressure fixture having the clip clamping mechanism has an aggregated extrusion force, and it can keep the extrusion force at the same pressure and still has certain extrusion force during the service life.

Description of marks in the accompanying drawings: 1 represents a clip; 11 represents a first clip; 12 represents a second clip; 13 represents a clamp base; 14 represents a clip reset spring; 111, 121 represent a front arm; 1111,1211 represent a gripping jaw; 112, 122 represent a rear arm; 2 represents a propulsion piece; 21 represents an accommodation cavity; 22 represents a wedge-shaped sidewall; 23 represents a propulsion piece reset spring; 24 represents a separator plate; 3 represents a drive unit (piston assembly); 31 represents a piston; 32 represents a piston rod; 33 represents a piston cover; 34 represents a piston assembly reset spring; 4 represents a fixed shaft; 5 represents a pulley; 6 represents a cylinder; 7 represents a rear base; 71 represents a pressure medium opening; 8 represents an open/close valve; 9 represents a valve drive piece.

DETAILED DESCRIPTION OF THE PREFERRED EMBODIMENTS

Figure 1:
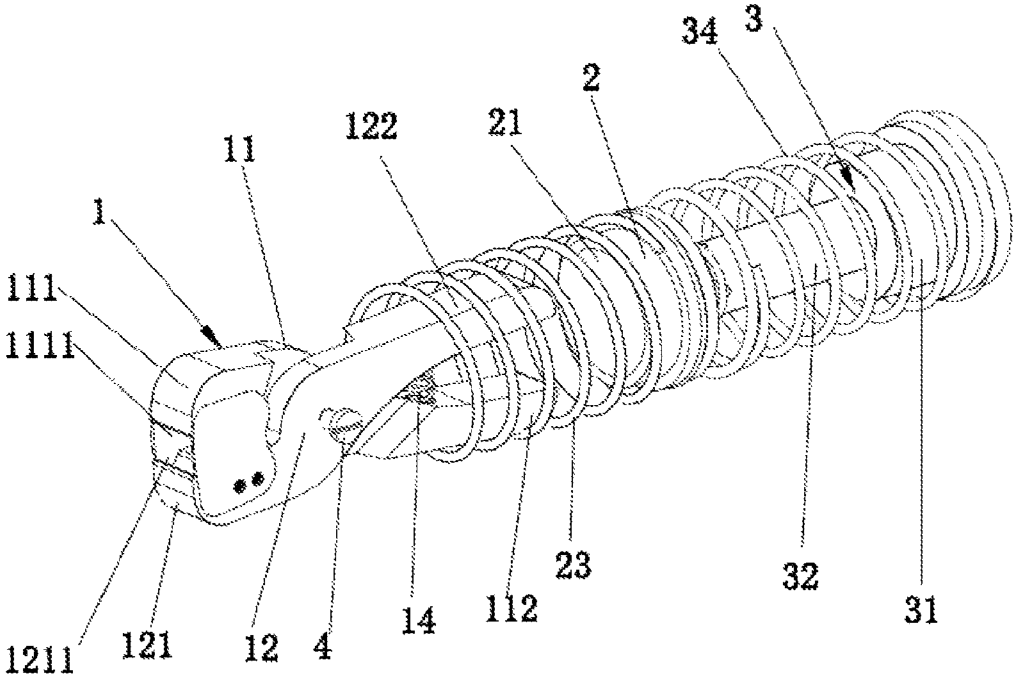
FIG. 1 shows a structure diagram of Embodiment 1 of a clip clamping mechanism of a pressure fixture in the disclosure.
Figure 2:
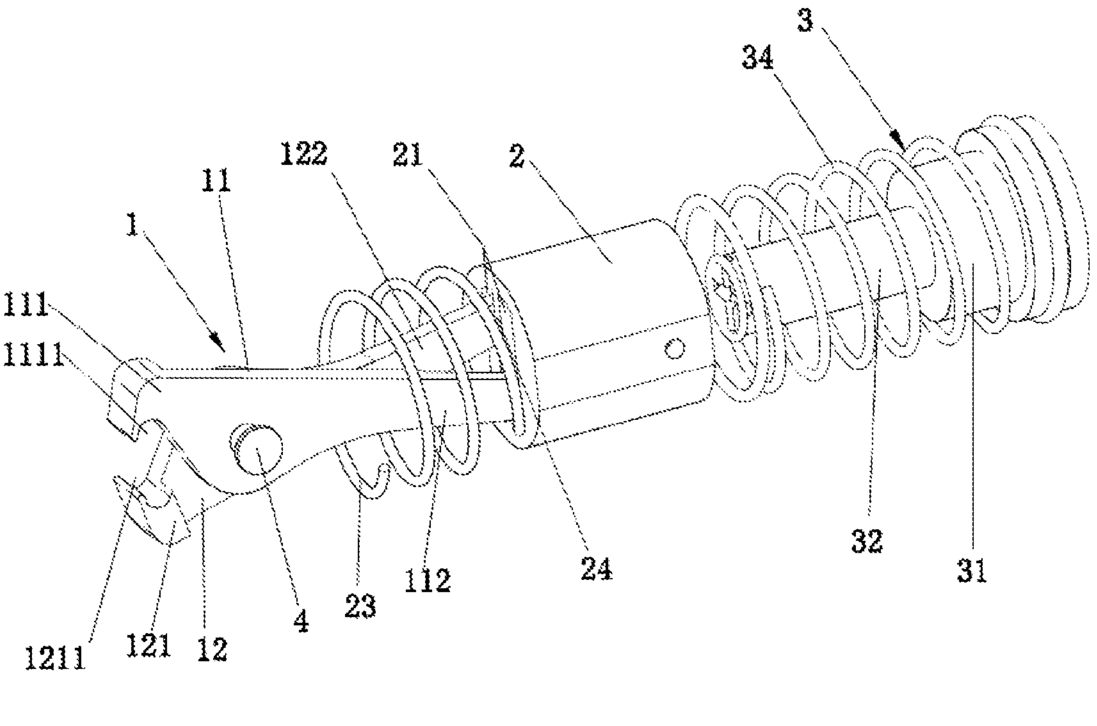
FIG. 2 shows a structure diagram of Embodiment 2 of a clip clamping mechanism of a pressure fixture in the disclosure.
Figure 3:
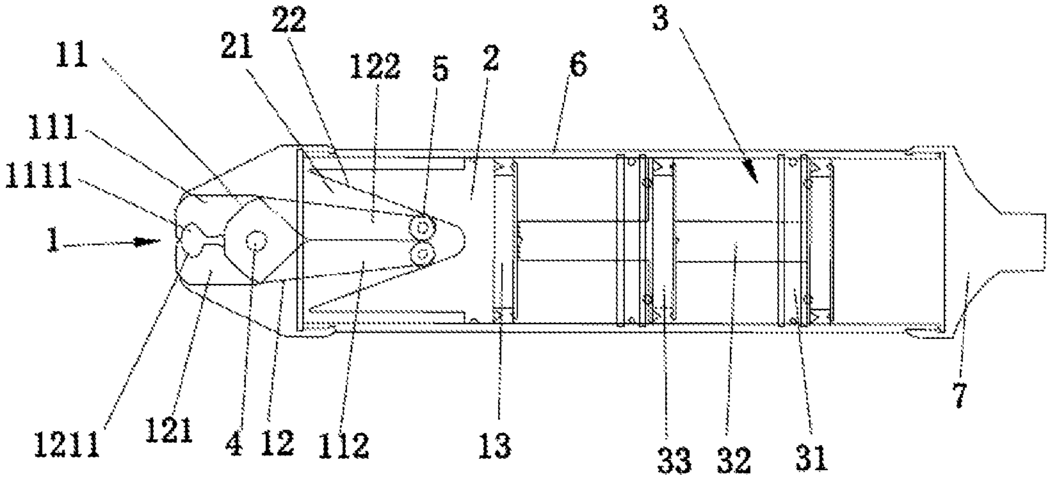
FIG. 3 shows a first diagram of the Embodiment 1 of the clip clamping mechanism of the pressure fixture applied to a pneumatic caliper.
Figure 4:
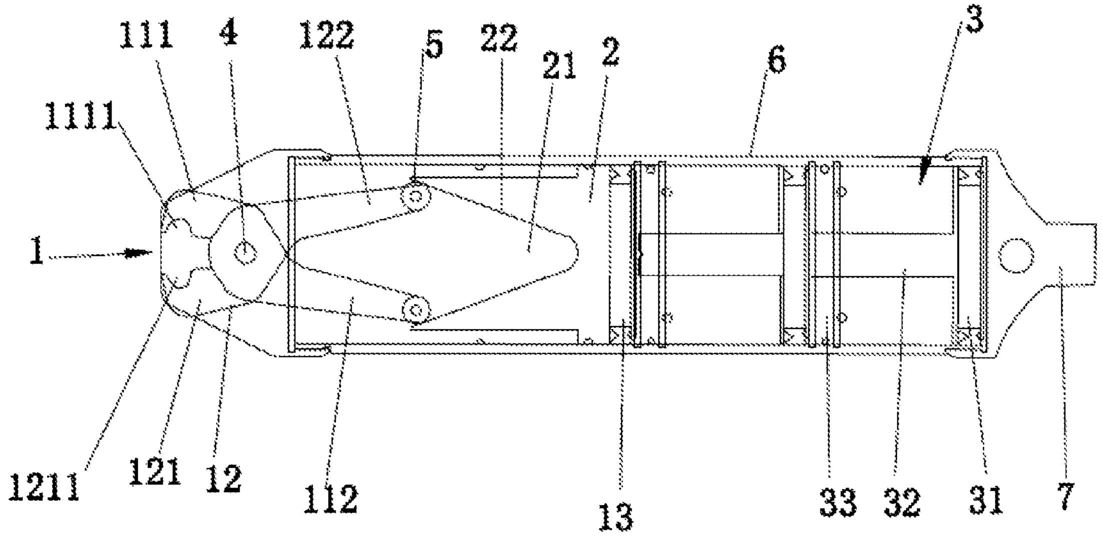
FIG. 4 shows a second diagram of the Embodiment 1 of the clip clamping mechanism of the pressure fixture applied to a pneumatic caliper.
Figure 5:
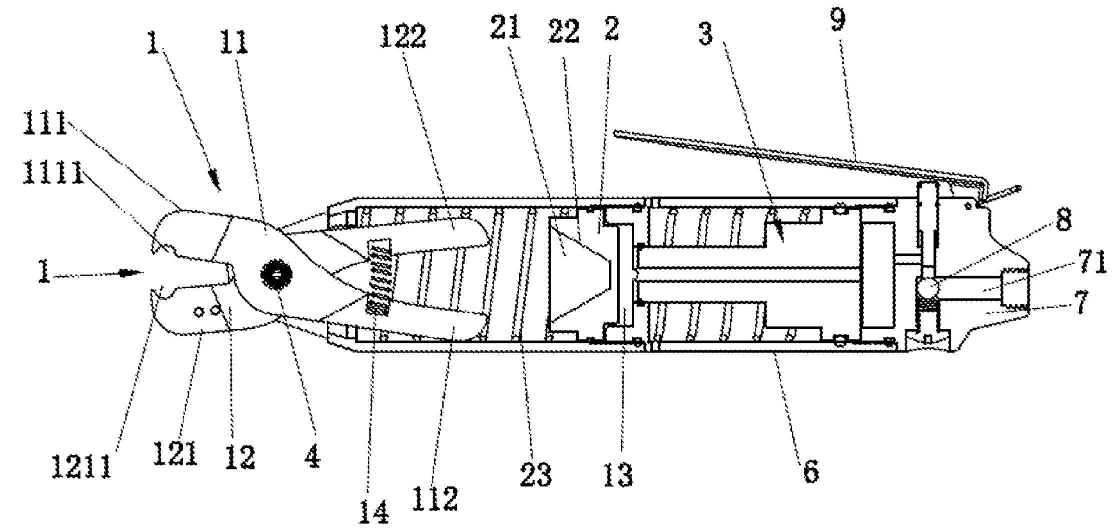
FIG. 5 shows a third diagram of the Embodiment 1 of the clip clamping mechanism of the pressure fixture applied to a pneumatic caliper.
Figure 6:
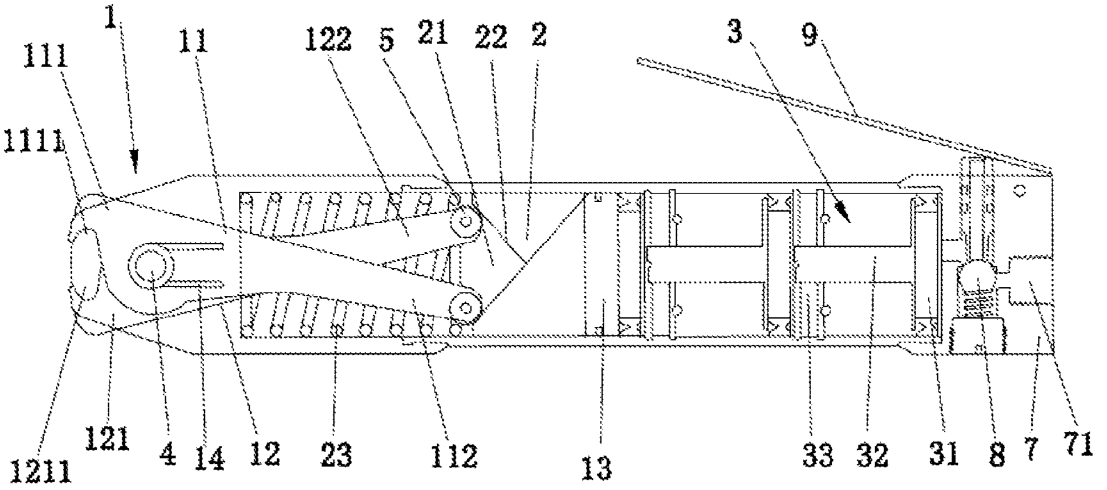
FIG. 6 shows a first diagram of the Embodiment 2 of the clip clamping mechanism of the pressure fixture applied to a pneumatic caliper.
Figure 7:
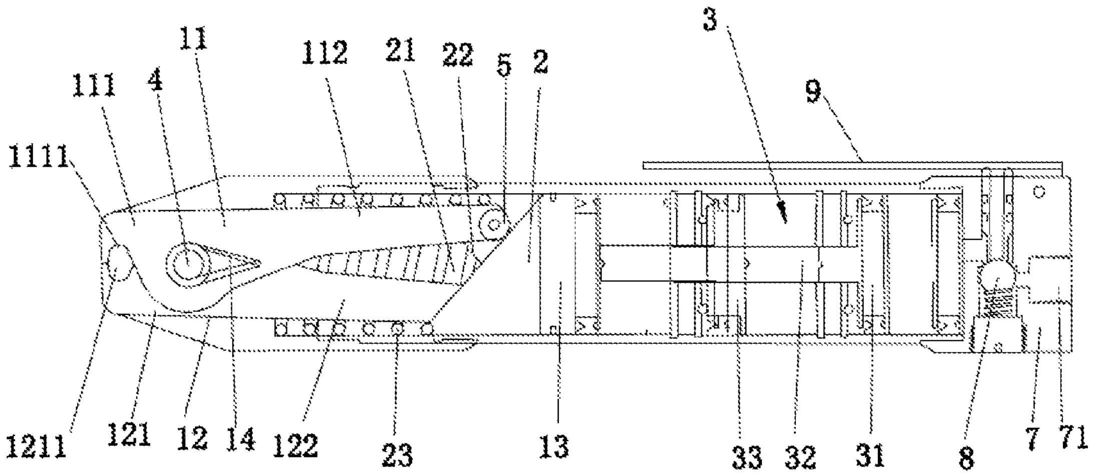
FIG. 7 shows a second diagram of the Embodiment 2 of the clip clamping mechanism of the pressure fixture applied to a pneumatic caliper.
Figure 8:
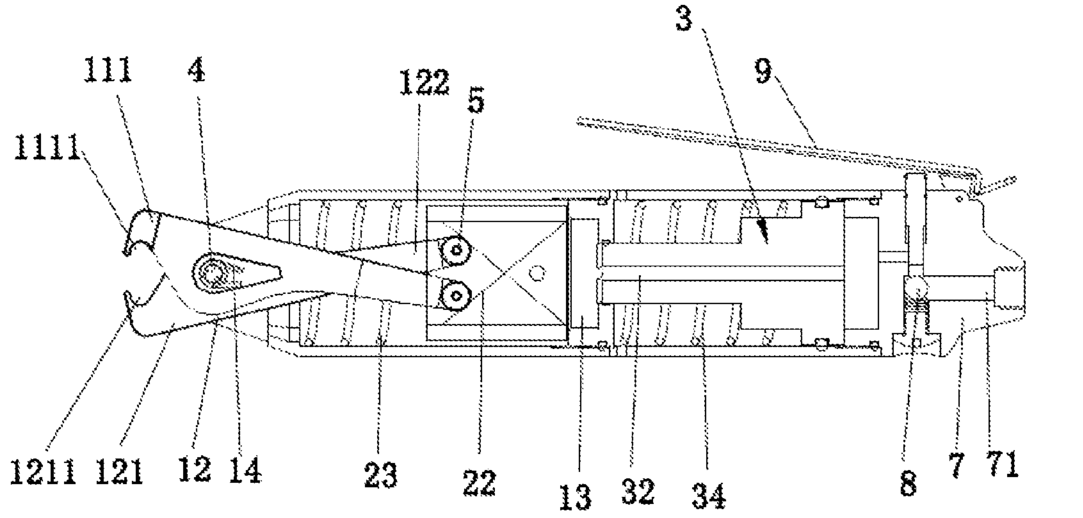
FIG. 8 shows a third diagram of the Embodiment 2 of the clip clamping mechanism of the pressure fixture applied to a pneumatic caliper.
Figure 9:
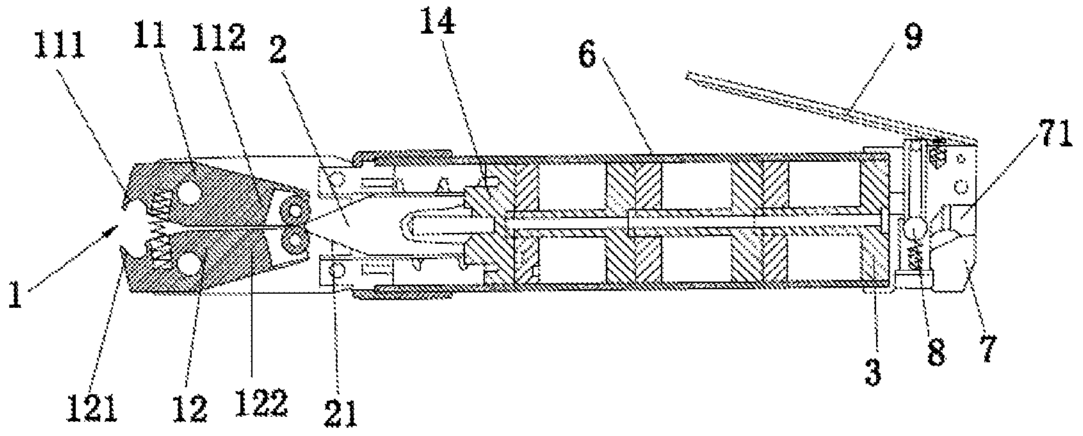
FIG. 9 shows a structure diagram of a pressure fixture in conventional art.

By reference to FIG. 1 to FIG. 9, a clip clamping mechanism of a pressure fixture and a pneumatic caliper having the same provided by the disclosure are further described below.

A clip clamping mechanism of a pressure fixture is provided, including: a clip 1, a propulsion piece 2, and a drive unit 3 which is used for pushing the propulsion piece 2 to move towards one side of the clip 1 so that the propulsion piece 2 controls the opening or clamping of the clip 1, wherein the clip 1 includes a fixedly mounted shaft, and a first clip 11 and a second clip 12 hinged through the fixed shaft; two ends of the first clip 11 and the second clip 12 corresponding to the hinging joint form respectively a front arm 111, 121, and a rear arm 112, 122 in linkage with the propulsion piece 2, wherein the propulsion piece 2 is provided with an accommodation cavity 21 for mounting the rear arm 112, 122; and the accommodation cavity 21 is arranged at one side corresponding to the clip 1 and is provided with a wedge-shaped sidewall 22 for butt junction and slip fit with the rear arm 112, 122 (it should be noted here that one of the two rear arms 112/122 can be fixed while the other rear arm 122/112 slips along the wedge-shaped side wall 22; in order to realize flexible slip and enough clamping force, preferably, in this embodiment both the rear arm 112 of the first clip and the rear arm 122 of the second clip are in butt junction and slip fit with the wedge-shaped side wall 22); one end of the accommodation cavity 21 corresponding to the front arm 111, 121 forms a big end with opening, while the other end corresponding to the front arm 111, 121 forms a small end.

In the compared document, through the above technical scheme, the first clip 11 and the second clip 12 are mounted on the clamp base 14 through two fixed shafts to realize a butting clamp function. In this disclosure, it is changed as that the first clip 11 and the second clip 12 are in a transmission connection through one fixed shaft only to realize butting clamp; then, this clip clamping mechanism, compared with that in the compared document, saves a fixed shaft, reduces manufacturing cost, is more difficult to damage and has a long service life.

In this embodiment, the hinging joint of the first clip 11 and the second clip 12 is provided with a fixed shaft 4, through which the first clip 11 and the second clip 12 are hinged, wherein the fixed shaft 4 is sleeved with a clip reset torsion spring 14 for resetting the first clip 11 and the second clip 12 (it should be noted here that the clip reset torsion spring 14 also can be arranged between the two rear arms 112, 122 or between the two front arms 111, 121; in order to enable a good fit between the first clip 11 and the second clip 12 and to enable a reliable reset of the first clip 11 and the second clip 12, preferably, in this embodiment, the clip reset torsion spring 14 is arranged on the fixed shaft); one end of the propulsion piece 2 corresponding to the clip 1 is provided with a propulsion piece reset spring 23 for resetting the propulsion piece 2, and both the rear arms 112, 122 are sleeved in the propulsion piece reset spring 23; one end of the rear arms 112, 122 of the first clip 11 and the second clip 12 corresponding to the propulsion piece 2 is provided with a pulley 5 which can form slip fit with the wedge-shaped side wall 22 (it should be noted here that the pulley 5 might not be arranged or might be arranged on one rear arm 112/122 only; in order to achieve a best flexibility of fit between the rear arm 112, 122 and the wedge-shaped sidewall 22, both the rear arms 112, 122 are provided with a pulley 5).

The clip reset spring 14 can reset the first clip 11 and the second clip 12 reliably, ensuring the first clip 11 and the second clip 12 to flexibly open or clamp so as to extrude or clamp machined work-piece; the propulsion piece reset spring 23 can reset the propulsion piece 2 reliably, ensuring a more flexible and reliable opening or clamping operation of the clip 1; the pulley 5 arranged on the rear arm 112, 122 enables a more flexible slip between the clip 1 and the propulsion piece 2.

The slip fit between the accommodation cavity 21 of the propulsion piece 2 and the rear arm 112, 122 of the clip 1 can be implemented through many ways; other structures, for example, clip reset spring 14, propulsion piece reset spring 23 and pulley 5 arranged on the rear arm 112, 122, can be arranged in these implementation ways.

Embodiment 1: the clip 1 and the propulsion 2 are arranged along the same axial direction; both the rear arm 112 of the first clip 1 and the rear arm 122 of the second clip 12 are arranged in one accommodation cavity 21, which is arranged as a triangular structure along the cross section of the axial line; preferably, the accommodation cavity 21 selects a conical structure; the wedge-shaped side wall 22 presents a straight line; the accommodation cavity 21 presents a circular arc shrinking to the small end from the big end (it should be noted here that the wedge-shaped side wall 22 also can present a circular arc, which can be a bulged circular arc; when the wedge-shaped sidewall 22 is a bulged circular arc, the clamping speed of the clip 1 first increases and then decreases in the condition that the propulsion piece 2 moves at a constant speed; when clamping articles such as hoop, ring washer, pin, cable terminal and cable clip, the clamping speed slows down near the end of the lamping action, the action is softer and the strength is not too much, so that the articles such as hoop, ring washer, pin, cable terminal and cable clip are better protected and no damage is caused at the final fastening).

Through the above technical scheme, the two rear arms 112, 122 might be arranged in one same accommodation cavity 21, thus the propulsion piece 2 needs to be provided with one accommodation cavity 21 only; the process is convenient; if the two rear arms 112, 122 slip out of the accommodation cavity 21 unexpectedly, they also can fall into the accommodation cavity 21 accurately again through the movement of the propulsion piece 2; the conical structure of accommodation cavity 21 enables the rear arms 112, 122 of the first clip 11 and the second clip 12 to be arranged in the accommodation cavity 21 at any angle, for the convenient assembling of clip 1 and propulsion piece 2.

Embodiment 2: the accommodation cavity is provided with a separator plate 24 for separating the rear arm of the first clip and the rear arm of the second clip.

Through the above technical scheme, another structure of the propulsion piece 2 is disclosed, that is, the accommodation cavity 21 is provided with a separator plate 24, which divides the cavity 21 into two chambers so that the two rear arms 112, 122 are separated from each other and have no impact on each other; thus, the pressure fixture of this structure has a stable extrusion force.

A pneumatic caliper is provided (it should be noted here that any one clip clamping mechanism of the pressure fixture described in claim 1 to claim 2 can be applied to other pressure fixtures; the applicant of this patent selects to apply the clip clamping mechanism to a pneumatic caliper, so as to extrude or clamp a hoop), which has any one clip clamping mechanism of the pressure fixture described in claim 1 to claim 2, including: a cylinder 6 having a passage, and a clamp base 13 and a rear base 7 arranged at two ends of the cylinder 6 respectively, wherein the clip 1 is fixedly connected with the clamp base 13; a drive unit 3 is arranged in the cylinder 6 and at least includes a set of piston assembly 3; the rear base 7 is provided with a pressure medium opening 71 for entrance of power source air (it should be noted here that the pressure medium source for supplying power can adopt a liquid medium; to consider that, when the pressure medium selects air, since the air is stable and reliable and has few or even no impurities between each component as a power source, thereby enabling the pneumatic clamp to have a longer service life without frequent maintenance, preferably, this embodiment selects air as the power source); the pressure medium opening 71 is in a conduction connection with the passage of the cylinder 6; the rear base 7 is provided with an open/close valve 8 for controlling the conduction or non-conduction between the pressure medium opening 71 and the passage; the open/close valve 8 is in linkage with a valve drive piece 9 (it should be noted there that the valve drive piece 9 preferably selects a handle).

A set of piston assembly 3 includes a piston 31, a piston rod 32 and a piston cover 33; the cylinder 6 is provided with two sets of piston assemblies 3 arranged along the same axial direction in turn (it should be noted here that there might be multiple sets of piston assemblies 3; preferably, this embodiment selects two sets), wherein the piston rod 32 of the latter set of piston assembly 3 resists on the end face of the piston 31 of the former set of piston assembly 3.

In this disclosure, no extra sealing element is needed and cost can be reduced, just by changing the procedure of arranging a sealing element at the edge of the end face of the piston rod 32 facing a next piston 31 (described in the compared document with authorization proclamation No. of CN1264650C) as the procedure of arranging the piston rod 32 of the latter set of piston assembly 3 to resist on the end face of the piston 31 of the former set of piston assembly 3 and ensuring a reliable connection between the two sets of piston assemblies 3 during assembling.

In addition, in order to enable the pneumatic caliper of the disclosure to reliably extrude or clamp a hoop, the front arm 111, 121 is provided with a gripping jaw 1111, 1211 respectively, wherein the gripping jaw 1111 and the gripping jaw 1211 form a cavity adapted to the hoop in shape and size.

What is claimed is:

1. A clip clamping mechanism of a pressure fixture, comprising a clip, a propulsion piece, and a drive unit which is used for pushing the propulsion piece to move towards one side of the clip so that the propulsion piece controls an opening or clamping of the clip, wherein the clip includes a fixedly mounted shaft, and a first clip and a second clip hinged through the fixed shaft; two ends of each of the first clip and the second clip form respectively a front arm, and a rear arm in linkage with the propulsion piece, wherein the propulsion piece is provided with an accommodation cavity for mounting the rear arms; and the accommodation cavity is provided with a wedge-shaped sidewall for butt junction and slip fit with the rear arms; one end of the accommodation cavity close to the front arms is a big end with an opening, while the other end far away the front arms is a small end, wherein the accommodation cavity is provided with a separator plate for separating the rear arm of the first clip and the rear arm of the second clip, wherein the accommodation cavity shrinks gradually from the big end to the small end and the wedge-shaped sidewall presents a bulged circular arc, wherein both the rear arms of the first clip and the second clip are provided with a pulley for slip fit with the wedge-shaped sidewall.

2. The clip clamping mechanism of claim 1 wherein the wedge-shaped sidewall presents a straight line.

3. The clip clamping mechanism of claim 2, wherein the accommodation cavity is arranged as a conical structure.

4. A clip clamping mechanism of a pressure fixture, comprising a clip, a propulsion piece, and a drive unit which is used for pushing the propulsion piece to move towards one side of the clip so that the propulsion piece controls an opening or clamping of the clip, wherein the clip includes a fixedly mounted shaft, and a first clip and a second clip hinged through the fixed shaft; two ends of each of the first clip and the second clip form respectively a front arm, and a rear arm in linkage with the propulsion piece, wherein the propulsion piece is provided with an accommodation cavity for mounting the rear arms; and the accommodation cavity is provided with a wedge-shaped sidewall for butt junction and slip fit with the rear arms; one end of the accommodation cavity close to the front arms is a big end with an opening, while the other end far away the front arms is a small end, wherein the accommodation cavity is provided with a separator plate for separating the rear arm of the first clip and the rear arm of the second clip, wherein the accommodation cavity shrinks gradually from the big end to the small end and the wedge-shaped sidewall presents a bulged circular arc, wherein one end of the propulsion piece corresponding to the clip is provided with a propulsion piece reset spring for resetting the propulsion piece, and both rear arms are sleeved in the propulsion piece reset spring.

5. A pneumatic caliper, which has the clip clamping mechanism of claim 1.

6. The pneumatic caliper according to claim 5, including: a cylinder having a passage, and a clamp base and a rear base arranged at two ends of the cylinder respectively, wherein the clip is fixedly connected with the clamp base; a drive unit is arranged in the cylinder and at least includes a set of piston assembly; the rear base is provided with a pressure medium opening for entrance of power source air; the pressure medium opening is in a conduction connection with the passage of the cylinder; the rear base is provided with an open and close valve for controlling a conduction or non-conduction between the pressure medium opening and the passage; the open and close valve is in linkage with a valve drive piece.

7. The pneumatic caliper according to claim 6, wherein a set of piston assembly includes a piston, a piston rod and a piston cover; the cylinder is provided with two sets of piston assemblies arranged along a same axial direction in turn, wherein the piston rod of a latter set of piston assembly resists on an end face of a piston of a former set of piston assembly.

* * * * *